United States Patent [19]

Kawamatsu

[11] Patent Number: 5,413,338
[45] Date of Patent: May 9, 1995

[54] GOLF CLUB SHAFT AND ITS MANUFACTURING MANDREL

[75] Inventor: Hideaki Kawamatsu, Takarazuka, Japan

[73] Assignee: Sumitomo Rubber Industries Inc., Kobe, Japan

[21] Appl. No.: 286,907

[22] Filed: Aug. 8, 1994

Related U.S. Application Data

[63] Continuation of Ser. No. 972,938, Nov. 6, 1992, abandoned.

[30] Foreign Application Priority Data

Nov. 15, 1991 [JP] Japan .................. 3-328183

[51] Int. Cl.$^6$ .............................................. A63B 53/10
[52] U.S. Cl. ........................... 273/80 B; 273/DIG. 23
[58] Field of Search ................. 273/80 R, 80 A, 80 B, 273/80 C, 81 R, 81 A, 77 R, 77 A, DIG. 23

[56] References Cited

U.S. PATENT DOCUMENTS

| | | | |
|---|---|---|---|
| 2,809,144 | 10/1957 | Grimes | 273/80 B |
| 3,313,541 | 4/1967 | Benkoczy | 273/80 R |
| 4,000,896 | 1/1977 | Lauraitis | 273/80 R |
| 4,288,075 | 9/1981 | Kaugars | 273/80 B |
| 4,319,750 | 3/1982 | Roy | 273/80 B |

FOREIGN PATENT DOCUMENTS

| | | | |
|---|---|---|---|
| 61-2276 | 1/1986 | Japan . | |
| 61-2277 | 1/1986 | Japan . | |
| 2053004 | 2/1981 | United Kingdom | 273/80 B |
| 2227418 | 8/1990 | United Kingdom | 273/77 A |

*Primary Examiner*—Sebastiano Passaniti
*Attorney, Agent, or Firm*—Armstrong, Westerman, Hatorri, McLeland and Naughton

[57] ABSTRACT

The outer circumferential surface of a mandrel in a bar-shaped configuration is wound with reinforced fiber impregnated with a resin. This reinforced fiber is heat-treated and hardened, to thereby form a reinforced fiber layer in a tubular configuration around the mandrel. The mandrel is provided with a reduced portion in the axial middle thereof, which is decreased in the outside diameter thereof. This mandrel comprises a basic end side member and a terminal end side member which are both connected such that they can be separated at the reduced portion. The separation of both component members of the mandrel is conducted axially in opposite directions, and this allows the detachment of the mandrel out of the reinforced fiber layer.

7 Claims, 3 Drawing Sheets

GOLF CLUB SHAFT AND ITS MANUFACTURING MANDREL

This application is a continuation of application Ser. No. 07/972,938, filed Nov. 6, 1992, now abandoned.

BACKGROUND AND SUMMARY OF THE INVENTION

The present invention relates to improvements in a usually cylindrical mandrel for manufacturing golf club shafts, and to an improved golf club shaft manufactured therewith.

A conventional type known golf club shaft comprising reinforced fiber is constructed such that a sheet of reinforced fiber impregnated with a thermosetting resin, or a bundle of reinforced fiber also impregnated with a thermosetting resin is wrapped around or wound on to the outer circumferential surface of a mandrel gradually decreased in the diameter thereof in a tapered or multistage configuration from the basic end portion thereof to the terminal end portion thereof, and after the resin has set or hardened around the outer circumferential surface of the mandrel, the mandrel is extracted from the layer of the reinforced fiber surrounding it, in the direction of the basic end portion thereof which has a larger diameter.

The conventional golf club shaft constructed in the foregoing manufacturing method is gradually increased in the rigidity thereof from the terminal end portion of a smaller diameter thereof to the basic end portion of a larger diameter thereof, because the mandrel for manufacturing the golf club shaft is gradually reduced in the diameter thereof from the basic end portion thereof to the terminal end portion thereof. However, this construction of the golf club shaft does not allow the rigidity thereof to be locally enlarged, and in fact, it reduces or limits the designing freedom to set what is called the low bending point and the high bending point freely in any desired place of the golf club shaft, and another designing freedom to distribute the weight, strength and the like of the golf club shaft therein as desired. This is a disadvantage of the conventional golf club shaft or the conventional mandrel for manufacturing it.

It is therefore an object of the present invention to provide an improved golf club shaft in which the foregoing disadvantage of the conventional golf club shaft is overcome, and the designing freedom is enhanced, thereby allowing the golf club shaft to be locally adjusted in the weight or strength distribution, and rigidity thereof.

It is also an object of the present invention to provide an improved mandrel for forming the foregoing improved golf club shaft of the present invention, in which the foregoing disadvantage of the conventional mandrel for manufacturing the conventional golf club shaft is overcome.

BRIEF DESCRIPTION OF THE DRAWINGS

The present invention will be described with reference to the accompanying drawings, in which.

DETAILED DESCRIPTION OF THE PREFERRED EMBODIMENTS

Some preferred embodiments of the mandrel according to the present invention will now be described with reference to the accompanying drawings.

Figure 1:
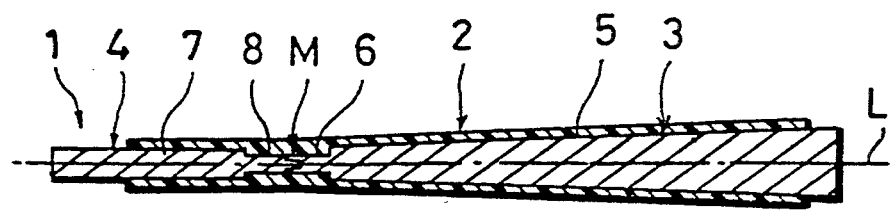
FIG. 1 is a cross sectional view of the mandrel of the present invention according to a first preferred embodiment thereof, which shows that the mandrel is in operation.

FIG. 1 shows a single preferred embodiment of the usually cylindrical mandrel 1 according to the present invention, and this mandrel has the outer circumferential surface thereof wrapped in a sheet of carbon fiber or wound with a bundle of reinforced fiber. In this case, each fiber is impregnated with a resin. A layer of reinforced fiber which is thus formed on the mandrel 1 is identified as 2 in FIG. 1.

The resin impregnated in the reinforced fiber is a thermosetting resin. Also, applicable reinforced fiber is a carbon fiber applied thereto in the present preferred embodiment of the invention, and any other kind of reinforced fiber may be employed.

The foregoing mandrel 1 comprises a basic end side member 3 and a terminal end side member 4 which are separably jointed to each other. That is to say, the mandrel 1 is formed with a reduced portion M in the middle thereof in the direction of the axis L. At this reduced portion M, the mandrel is greatly decreased in the diameter thereof as compared with the other portions. Moreover, this reduced portion M is provided with jointing structure 20 which achieves the separable connection of the basic end side member 3 and the terminal end side member 4 to each other.

The basic end side member 3 comprises a tapered portion 5 which is gradually reduced in the diameter thereof in the direction of the terminal end thereof, and a small-diameter portion 6 which is smaller in the diameter thereof than the terminal end of the tapered portion 5 and is connected to the terminal end of the tapered portion 5. The outside diameter of this small-diameter portion 6 remains constant or is tapered to the terminal end thereof.

Also, the terminal end side member 4 comprises a body portion 7 in a claviform configuration which remains constant or is gradually increased in the diameter thereof in the direction of the terminal end thereof, and a small-diameter portion 8 which is smaller in the diameter thereof than the body portion 7 and is joined to the basic end of the body portion 7. The claviform body portion 7 may remain constant in the direction of the terminal end thereof from the basic end thereof. The small-diameter portion 8 of the terminal end side member 4 remains constant in any portion thereof, or is tapered in the direction of the basic end thereof.

Figure 2:
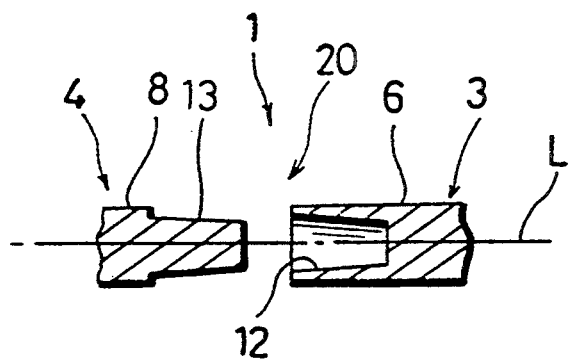
FIG. 2 is an enlarged sectional view of a principal portion of the mandrel shown in FIG. 1.

As illustrated in FIG. 2, the jointing structure 20 comprises a mortise means 12 which is tapered in the direction of the basic end of the mandrel 1, and a tenon means 13 also tapered in the direction of the basic end of the mandrel. The tenon means 13 is closely fitted in the mortise means 12. In this embodiment of the present invention, the mortise means 12 is located in a terminal end surface of the small-diameter portion 6 of the basic end side member 3, and the small-diameter portion 8 of the terminal end side member 4 is provided with the tenon means 13 in a basic end surface thereof.

Figure 3:
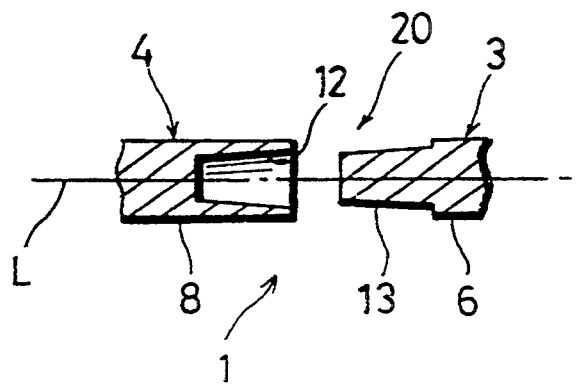
FIG. 3 is an enlarged sectional view of a principal portion of the mandrel according to a second preferred embodiment of the present invention.

In an alternative embodiment, as shown in FIG. 3, the mortise means 12 may be located in the terminal end side member 4, while on the other hand, the tenon means 13 may be formed in the basic end side member 3. Thus, the tenon means 13 is closely fitted into the mortise means 12, to thereby connect the small-diameter portions 6 and 8 of the basic end side member 3 and the terminal end side member 4 to each other.

The outer circumferential surface of the small-diameter portion 6 of the basic end side member 3 and that of the small-diameter portion 6 of the terminal end side member 4 are arranged to be flush or on the same level with each other when the basic end side member 3 and the terminal end side member 4 are jointed to each other. With such an arrangement, the outer circumferential surfaces of the small-diameter portion 6 and the small-diameter portion 8 are allowed to form the reduced portion M in the jointed state of the basic end side member 3 and the terminal end side member 4 to each other.

Figure 4:
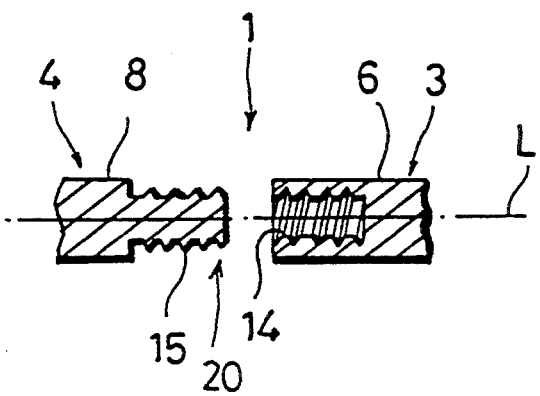
FIG. 4 is an enlarged sectional view of a principal portion of the mandrel according to a third preferred embodiment of the present invention.

Also, the jointing structure 20 may be preferably formed by using a female threaded hole 14 and a male screw means 15 which is detachably engaged with the female threaded hole 14. In FIG. 4, the female threaded hole 14 is formed in the small-diameter portion 6 of the basic end side member 3, and the male screw means 15 is located in the basic end portion of the small-diameter portion 8 of the terminal end side member 4.

Figure 5:
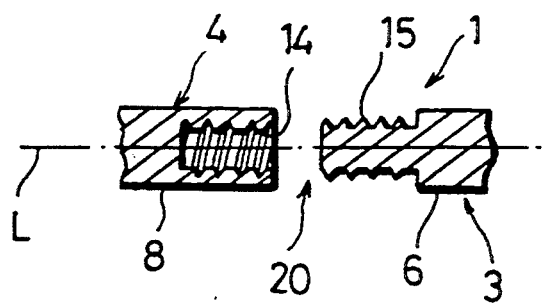
FIG. 5 is an enlarged sectional view of a principal portion of the mandrel according to a fourth preferred embodiment of the present invention.

Alternatively, in FIG. 5, the female threaded hole 14 and the male screw means 15 are respectively formed in the small-diameter portion 8 of the terminal end side member 4 and in the small-diameter portion 6 of the basic end side member 3.

In any case, the jointing structure 20 is located within the range of the reduced portion M of the mandrel 1 and also in the place at which the outside diameter and the small-diameter portion 6 and that of the small-diameter portion 8 become the smallest in their size with the exception of the foregoing tenon means 13 and the male screw means 15.

On the other hand, the reinforced fiber layer 2 is arranged to cover the outer circumferential surface of the mandrel 1 such that the corresponding portion of the layer 2 to the reduced portion M of the mandrel has larger thickness than the other portions of the layer 2 which ramain constant in their thickness.

Figure 6:
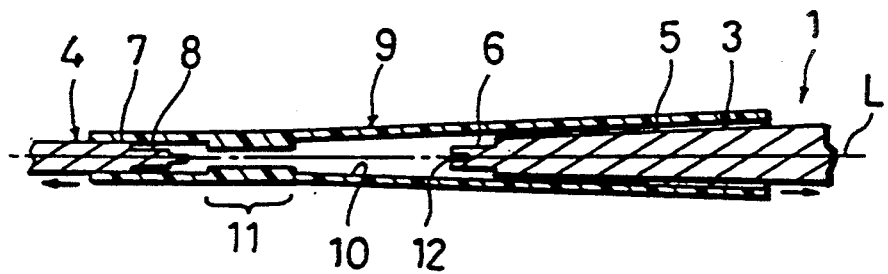
FIG. 6 is a cross sectional view of a golf club shaft according to a preferred embodiment of the present invention, which serves also as an explanatory view of the manufacturing method in which the golf club shaft is produced by using the mandrel according to the first, second, third or fourth preferred embodiment of the present invention.

With such an arrangement, if the mandrel 1 is separated into the basic end side member 3 and the terminal end side member 4 after the reinforced fiber layer 2 has been heat-treated and hardened, the basic end side member 3 and the terminal end side member 4 are allowed to be extracted from the inside of the mandrel 1 in opposite directions along the axis L, as shown in FIG. 6.

Thus, the golf club shaft 9 according to the present invention is formed.

If the jointing structure 20 comprises the mortise means 12 and the tenon means 13 as shown in FIGS. 2 and 3, the inside surface of the mortise means 12 and/or the Outside surface of the tenon means 13 is desired to have a surface lubricant or parting agent applied thereto.

The golf club shaft 9 thus obtained is provided with a portion 11 of higher rigidity in the middle thereof 1 in the direction of the axis L thereof, and this higher-rigidity portion 11 is locally increased in the circumferential thickness thereof. In other words, the higher-rigidity portion 11 is formed by locally decreasing the inside diameter of a hollow portion 10 along the axis L.

Figure 7:
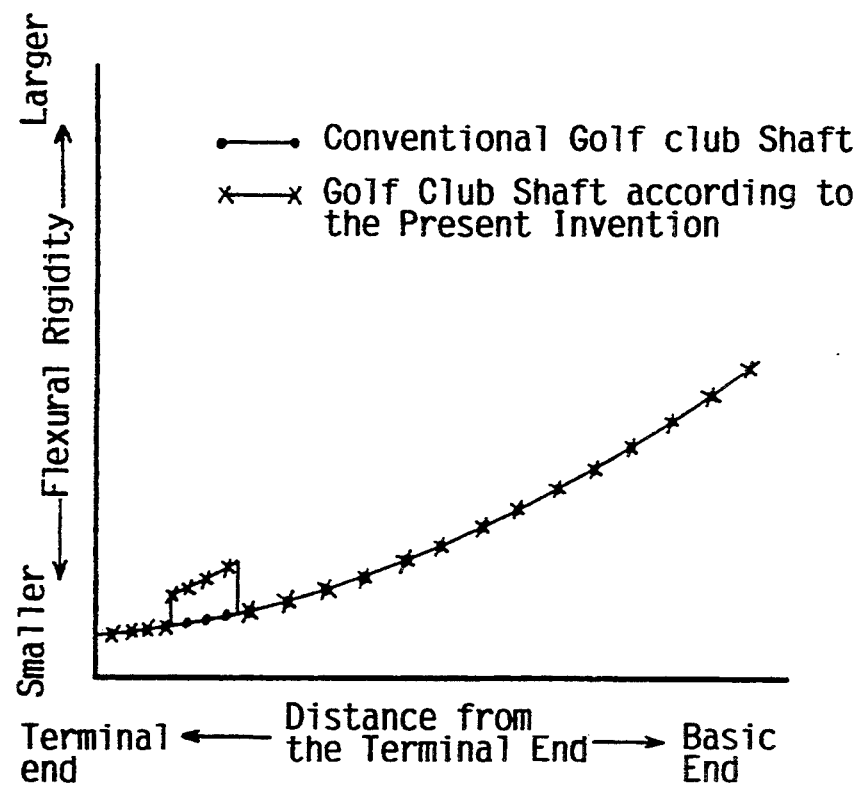
FIG. 7 is a graph which shows numerical values of flexural rigidity of the golf club shaft according to the present invention and those of flexural rigidity of a conventional golf club shaft.

FIG. 7 is a graph which shows values of flexural rigidity of the golf club shaft according to the present invention and those of flexural rigidity of the conventional golf club shaft. From this FIG. 7 it is apparent that the flexural rigidity of the golf club shaft according to the present invention is locally greater in the portion thereof adjacent the basic end side thereof. That is to say, in the golf club shaft according to the present invention, the flexural rigidity thereof is great at the higher rigidity portion 11 thereof, thereby allowing the golf club shaft to have the low bending point thereof.

The reduced portion M of the mandrel 1 can be freely changed in the position thereof along the mandrel in the direction of the axis L, and this correspondingly allows the higher rigidity portion 11 to be changed in the position thereof along the golf club shaft 9 in the direction of the axis L. As a result, it is feasible to design this golf club shaft 9 to have the low bending point, and to furnish the golf club shaft with a subtle change in the rigidity thereof.

As is apparent from the foregoing description, the feasibility to locate the higher-rigidity portion 11 at any desired position of the golf club shaft in the direction of the axis L thereof achieves the enhancement of the designing freedom in which the rigidity or the bending center, the weight, and the strength can be freely allocated in any desired position of the golf club shaft.

The higher rigidity portion 11 can be slightly decreased in the diameter of a limited zone thereof.

Also, in FIGS. 1, 2 and 3, the reduced portion M of the mandrel 1 may be temporarily wrapped in a basic fiber sheet of small thickness, and then, may be regularly wrapped in a second fiber sheet. If this reduced portion M is only wrapped in a single fiber sheet, there is a risk that the jointed portion of the mandrel 1 can not be prevented from loosening. This risk is obviated by the double wrapping of the mandrel.

The mandrel according to the present invention is provided with the reduced portion M, and this allows the manufacturing of the foregoing golf club shaft in which the circumferential wall thickness is partially increased to thereby enhance the designing freedom of the golf club shaft. Also, the mandrel 1 is formed with the reduced portion M in the axial middle thereof, and at this reduced portion, the mandrel is arranged to be separated into the basic end side member 3 and the terminal end side member 4. As a result, after the resin which forms the layer 2 of reinforced fiber has set or hardened around the mandrel, it is easily feasible to extract the mandrel means out of the reinforced-fiber layer 2.

As is apparent from the foregoing description, the mandrel according to the present invention can be arranged to easily have either of the high bending point or the low bending point, thereby achieving the manufacturing of golf club shafts which are suitable for the golfers' physical strength, playing skill and other conditions.

Although the present invention has been fully described by way of examples with reference to the accompanying drawings, it is to be noted here that various changes and modifications will be apparent to those skilled in the art. Therefore, unless otherwise such changes and modifications depart from the scope of the present invention, they should be construed as being included therein.

I claim:

1. A hollow golf club shaft made of reinforced fiber impregnated with a resin and having a basic end and a terminal end wherein an axial hollow portion, intermediate said basic end and said terminal end, is integrally formed in said reinforced fiber impregnated with said resin in said golf club shaft and has a decreased inside diameter in the hollow of said golf club shaft forming a portion of high rigidly intermediate said basic end and said terminal end, which high rigidly portion is locally increased in thickness and is produced by winding said reinforced fiber on a mandrel forming golf club shafts, said mandrel having a reduced diameter portion at which portion the outside diameter of said mandrel is locally decreased in the axial middle of said mandrel, said reduced portion being formed with a jointing structure allowing said mandrel to be separated into a basic end side member and a terminal end side member.

2. A hollow golf club shaft made of reinforced fiber impregnated with a resin and having a basic end and a terminal end wherein an axial hollow portion, intermediate said basic end and said terminal end, is integrally formed in said reinforced fiber impregnated with said resin in said golf club shaft and has a decreased inside diameter in the hollow of said golf club shaft forming a portion of high rigidity intermediate said basic end and said terminal end, which high rigidity portion is locally increased in thickness by winding said reinforced fiber on a mandrel forming golf club shafts, said mandrel having a reduced portions portion at which the outside diameter of said mandrel is locally decreased, said reduced being provided in the axial middle of said mandrel, said reduced portion being formed with jointing structure comprised of a tapered mortise means and a tapered tenon means closely engaged with said mortise means, allowing said mandrel to be separated into a basic end side member and a terminal end side member.

3. A hollow golf club shaft made of reinforced fiber impregnated with a resin and having a basic end and a terminal end wherein an axial hollow portion, intermediate said basic end and said terminal end, is integrally formed in said reinforced fiber impregnated with said resin in said golf club shaft and has a decreased inside diameter in the hollow of said golf club shaft forming a portion of high rigidly intermediate said basic end and said terminal end in which said high rigidity portion is locally increased in thickness and produced by winding said reinforced fiber on a mandrel to form said golf club shafts, said high rigidity portion having a reduced portion at which the outside diameter of said mandrel is locally decreased in the axial middle of said mandrel, while at the same time, said reduced portion of said mandrel is formed with jointing structure comprising a female threaded hole and a male screw means detachably engaged with said female threaded hole, allowing said mandrel to be separated into a basic end side member and a terminal end side member.

4. A hollow golf club shaft made of reinforced fiber impregnated with a resin and having a basic end and a terminal end wherein an axial hollow portion, intermediate said basic end and said terminal end, is integrally formed in said reinforced fiber impregnated with said resin in said golf club shaft and has a decreased inside diameter in the hollow of said golf club shaft forming a portion of high rigidity intermediate said basic end and said terminal end which high rigidity portion is locally increased in thickness and is produced by winding said reinforced fiber on a mandrel forming golf club shafts, said mandrel having a reduced portion at which the outside diameter of said mandrel is locally decreased in the axial middle of said mandrel, said reduced portion being formed with a jointing structure allowing said mandrel to be separated into a basic end side member and a terminal end side member, said basic end side member having a tapered portion gradually reduced in the diameter in the direction of the terminal end thereof, and a small-diameter portion smaller in diameter than the terminal end of said tapered portion and connected to said terminal end of said tapered portion.

5. A hollow golf shaft made of reinforced fiber impregnated with a resin and having a basic end and a terminal end wherein an axial hollow portion, intermediate said basic end and said terminal end, is integrally formed in said reinforced fiber impregnated with said resin in said golf club shaft and has a decreased inside diameter in the hollow of said golf club shaft forming a portion of high rigidity intermediate said basic end and said terminal end, which high rigidity portion is locally increased in thickness and is produced by winding said reinforced fiber on a mandrel forming golf club shafts having a reduced portion at the outside diameter of said mandrel which is locally decreased in the axial middle of said mandrel, while at the same time, said reduced portion is formed with jointing structure allowing said mandrel to be separated into a basic end side member and a terminal end side member, said terminal end side member comprising a body portion in a claviform configuration which remains substantially constant in the diameter of said mandrel in the direction of the terminal end thereof, and a small-diameter portion, smaller in diameter than the body portion of said mandrel and joined to the basic end of the body portion.

6. A hollow golf club shaft made of reinforced fiber impregnated with a resin and having a basic end and a terminal end wherein an axial hollow portion, intermediate said basic end and said terminal end, is integrally formed in said reinforced fiber impregnated with said resin in said golf club shaft and has a decreased inside diameter in the hollow of said golf club shaft forming a portion of high rigidity intermediate said basic end and said terminal end in which said high rigidity portion is increased in thickness and is produced by winding said reinforced fiber on a mandrel forming golf club shafts, said mandrel having a reduced portion at which the outside diameter of said mandrel is locally decreased and provided in the axial middle of said mandrel, said reduced portion being formed with a jointing structure allowing said mandrel to be separated into a basic end side member and a terminal end side member, said resin impregnated into said reinforced fiber being a thermosetting resin.

7. A hollow golf club shaft made of reinforced fiber impregnated with a resin and having a basic end and a terminal end wherein an axial hollow portion, intermediate said basic end and said terminal end, is integrally formed in said reinforced fiber impregnated with said resin in said golf club shaft and has a decreased inside diameter in the hollow of said golf club shaft forming a portion of high rigidity intermediate said basic end and said terminal end in which said high rigidity portion is locally increased in thickness and produced by winding said reinforced fiber on a mandrel forming golf club shafts, said mandrel having a reduced portion at which the outside diameter of said mandrel is locally decreased and provided in the axial middle of said mandrel and forming a joint structure, allowing said mandrel to be separated into a basic end side member and a terminal end side member, said reinforced fiber being carbon fiber.

* * * * *

UNITED STATES PATENT AND TRADEMARK OFFICE
CERTIFICATE OF CORRECTION

PATENT NO. : 5,413,338
DATED : May 9, 1995
INVENTOR(S) : Hideaki Kawamatsu

It is certified that error appears in the above-indentified patent and that said Letters Patent is hereby corrected as shown below:

On the title page: Item [73], "Sumitomo Rubber Industries Inc."- should read --Sumitomo Rubber Industries Ltd. --.

Signed and Sealed this

Twenty-sixth Day of September, 1995

Attest:

BRUCE LEHMAN

*Attesting Officer*　　　　*Commissioner of Patents and Trademarks*